United States Patent
Matuszeski et al.

(10) Patent No.: US 8,296,036 B2
(45) Date of Patent: Oct. 23, 2012

(54) AIRCRAFT POWER MANAGEMENT

(75) Inventors: Thaddeus Benjamin Matuszeski, Sherman Oaks, CA (US); Rolland Mitchell Koch, Simi Valley, CA (US); Scott Garret Berman, Los Angeles, CA (US); Mujahid Abdulrahim, Canoga Park, CA (US)

(73) Assignee: AeroVironment, Inc., Monrovia, CA (US)

( * ) Notice: Subject to any disclaimer, the term of this patent is extended or adjusted under 35 U.S.C. 154(b) by 565 days.

(21) Appl. No.: 12/565,426

(22) Filed: Sep. 23, 2009

(65) Prior Publication Data

US 2011/0071705 A1   Mar. 24, 2011

(51) Int. Cl.
*B64C 11/00* (2006.01)
*F02D 9/00* (2006.01)

(52) U.S. Cl. ............ 701/99; 701/2; 701/3; 244/190
(58) Field of Classification Search .............. None
See application file for complete search history.

(56) References Cited

U.S. PATENT DOCUMENTS

| | | | |
|---|---|---|---|
| 4,185,460 A | 1/1980 | Moore et al. | |
| 5,315,819 A | 5/1994 | Page et al. | |
| 5,810,284 A | 9/1998 | Hibbs et al. | |
| 8,128,019 B2 * | 3/2012 | Annati et al. | 244/23 A |
| 2006/0071630 A1 | 4/2006 | Dame et al. | |
| 2007/0024234 A1 | 2/2007 | Potter et al. | |
| 2008/0184906 A1 | 8/2008 | Kejha | |

OTHER PUBLICATIONS

International Search Report and Written Opinion for corresponding International Application No. PCT/US2010/049451, mailed Nov. 15, 2010 (8 pages).

* cited by examiner

*Primary Examiner* — Michael J. Zanelli
(74) *Attorney, Agent, or Firm* — Nathan O. Greene; Brinks Hofer Gilson & Lione; Eric J. Aagaard

(57) ABSTRACT

An electric power management system of a vehicle may interconnect a power plant, a propeller drive unit, and a battery via a bus. A controller may direct the operation of the power plant and the propeller drive unit. In a slow control mode, the propeller drive unit may react slowly to small throttle change requests. In the slow control mode, the propeller drive unit may draw power completely or substantially from the power plant. Upon a throttle request to rapidly change propeller drive unit speed more than a threshold amount, the controller may direct that the propeller drive unit quickly obtain the requested speed by drawing power required from the battery in excess of that being generated from the power plant. Subsequently, the controller may direct that the power plant increase power generation to maintain the propeller drive unit at the new speed, and recharge or float the battery.

22 Claims, 14 Drawing Sheets

AIRCRAFT POWER MANAGEMENT

FIELD

The present invention relates generally to power management. More particularly, the present invention relates to vehicle electric power management systems.

BACKGROUND

The way that the Vietnam War is now remembered as the helicopter war, the current conflicts in Iraq and Afghanistan may be remembered for the use of unmanned drones. Drones may facilitate remote intelligence gathering, alleviating the need for foot soldiers to enter into hostile areas "blind," with little or no information about the location and strength of hostile forces. Drones may provide close combat support, such as identifying and eliminating targets of interests, alleviating the need to expose soldiers and/or airmen to potential small arms fire, mortars, rocket grenades, road-side bombs, anti-aircraft weaponry, missiles, and other dangers.

With aircraft generally there is a long felt need to enhance performance. Prior power management improvements include those disclosed in U.S. Pat. No. 5,315,819 (system with various modes of operation) and U.S. Pat. No. 4,185,460 (system controlling fuel supply to a turbine engine). However, operational capabilities of conventional vehicles and aircraft, including unmanned drones, may remain limited.

BRIEF SUMMARY

The disclosed system and method may enhance the performance of a vehicle. The vehicle may include an electric power management system that provides rapid vehicle response to throttle requests. In the case of an aircraft, the power management system may employ a power bus that interconnects a power plant, a propeller drive unit (PDU), a battery, avionics, and auxiliary loads. A controller may direct the operation of the power plant, the propeller drive unit, avionics, and auxiliary loads, and may receive feedback from the battery and power bus. In a slow throttle mode, the controller may direct that the power plant supply power to the propeller drive unit and other loads, and maintain the battery on approximately a trickle charge or discharge. In response to small requested changes in propeller drive unit speed, the propeller drive unit may track the output of the power plant as the power generated by the power plant slowly increases or decreases. In a fast throttle mode, such as upon a sudden and large change in requested propeller drive unit speed, the controller may direct that the propeller drive unit quickly increase speed by drawing additional power from the battery in excess of that being generated by the power plant. Subsequently, the controller may direct that the power plant generate a new power level commensurate with the requested propeller drive unit speed and the power being drawn by any auxiliary loads, as well as replenish the battery.

In one embodiment, an electric power management system for a vehicle may be provided. The electric power management system may include a power plant configured to generate electrical power and to supply a voltage to a power bus, and a battery interconnected with the power bus. The battery may be configured to be charged from power generated by the power plant and that is supplied from the power plant to the battery via the power bus. The system may include a propeller drive unit interconnected with the power bus. The propeller drive unit may be configured to draw power from the power plant via the power bus to cause movement of the vehicle. A controller may be configured to direct the power management system in a plurality of distinct modes of operation. Each distinct mode of operation may control the propeller drive unit in a different manner. A first distinct mode of operation may be a slow throttle mode, and a second distinct mode of operation may be a fast throttle mode. In the slow throttle mode, the flow of power may be from the power plant and into the propeller drive unit and the battery. In the fast throttle mode, the flow of power may be from the battery and the power plant into the propeller drive unit. In the fast throttle mode, an increase in propeller drive unit speed that is requested is initially powered generally entirely by the battery. As a result, in the fast throttle mode, the propeller drive unit speed is not limited by a present level of power being generated by the power plant.

In another embodiment, an electric power management system for a vehicle may be provided. The electric power management system may include a power plant configured to generate electrical power and to supply a voltage to a power bus, and a battery interconnected with the power plant via the power bus. The battery may be configured to either discharge current to the power bus or draw current from the power bus to charge itself depending upon a level of a bus voltage associated with the power bus. The system may include a propeller drive unit interconnected with both the power plant and the battery via the power bus. The propeller drive unit may be configured to draw power from the power plant and battery via the power bus. A controller may be configured to direct the power management system in a plurality of distinct modes of operation. Each distinct mode of operation may control the propeller drive unit in a different manner. A first distinct mode of operation may be a slow control mode and a second distinct mode of operation may be a fast control mode. In the slow control mode, the controller may direct that changes in the speed of the propeller drive unit track changes in the power being generated by the power plant by directing the propeller drive unit to use only approximately the amount of power being provided to the propeller drive unit from the power plant via the power bus. In the fast control mode, the controller may direct the propeller drive unit to quickly respond to an increase in speed requested of the propeller drive unit by drawing the additional power necessary from the battery to attain the requested speed and in excess of the power being provided to the propeller drive unit by the power plant via the power bus. As a result, the speed of the propeller drive unit is not limited by a level of power being generated by the power plant.

In another embodiment, a method of electric power management may be provided. The method may include generating electric power from a power plant located on a vehicle. The power plant may be interconnected with a bus. The method may include powering a propeller drive unit of the vehicle in a slow throttle mode of operation from a voltage placed onto the bus by the power plant. The propeller drive unit may drive a propeller using power from the power plant in the slow throttle mode. The method may include switching to a fast throttle mode of operation in which the propeller drive unit immediately draws additional power necessary from the battery to increase propeller speed by an amount requested and in excess of the power being provided to the propeller drive unit by the power plant via the bus.

Advantages will become more apparent to those skilled in the art from the following description of the preferred embodiments which have been shown and described by way of illustration. As will be realized, the system and method are capable of other and different embodiments, and their details are capable of modification in various respects. Accordingly, the drawings and description are to be regarded as illustrative in nature and not as restrictive.

DETAILED DESCRIPTION

Figure 1:
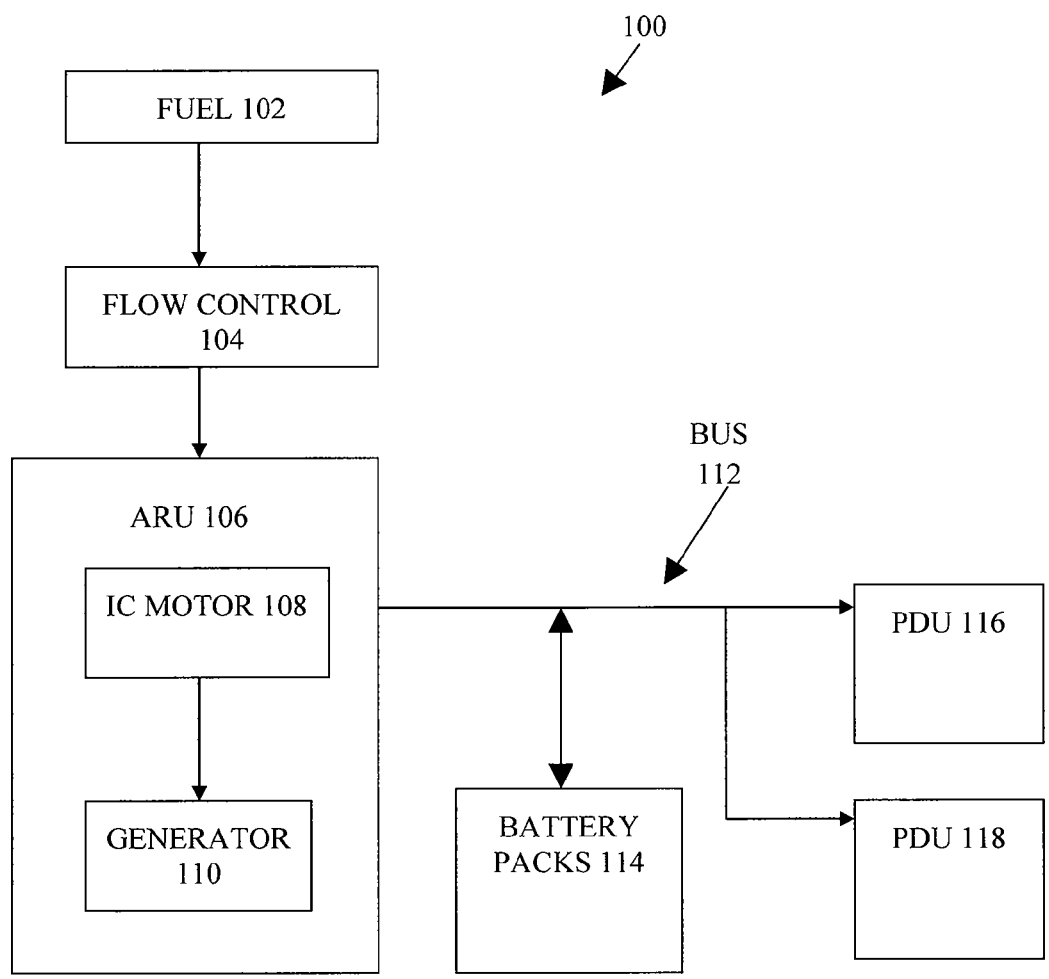
FIG. 1 illustrates an exemplary electric power management system.

A system and method may provide an electric power management system that enhances vehicle performance. The electric power management system may increase the response time of a vehicle to significant throttle increases. The vehicle may include a power plant, a battery, and one or more propeller drive units (PDUs) that are interconnected via a power bus. A controller may direct the operation of the power plant and the propeller drive units in multiple control modes. In a slow throttle mode of operation, the propeller drive units may draw power primarily or entirely from the power plant. In a fast mode of operation, the propeller drive units may rapidly draw power from the battery in excess of that currently being provided to the propeller drive unit by the power plant via the power bus.

The power management system may include a power plant configured to generate power and supply a voltage to a power bus. The power plant may include an internal combustion engine, an external combustion engine, a fuel cell, or any other power plant coupled to an electric generator. The power plant may accept liquid hydrogen as a fuel. The fuel may run the engine, and in turn the generator may generate power to be placed onto the power bus.

The power management system may include a battery or a battery pack interconnected with the power plant via the power bus. Depending upon a level of bus voltage, the battery may be configured to either discharge current to the power bus or draw current from the power bus to charge itself.

The power management system may include one or more propeller drive units interconnected with both the power plant and the battery via the power bus. Each propeller drive unit may be configured to draw power from the power plant and/or the battery via the power bus and use the power drawn to cause movement of the vehicle. In one embodiment, a propeller drive unit may be configured to rotate a propeller and supply power to the battery, auxiliary loads, or other propeller drive units via the power bus by wind-milling the propeller in a regeneration mode of control of the associated propeller drive unit.

The power management system may include a processing unit configured to control each propeller drive unit in a plurality of distinct modes of operation. Each distinct mode of operation may provide a different source of power, or a different combination of power sources, that provides power to each propeller drive unit.

A first distinct mode of operation may be a slow throttle mode, and a second distinct mode of operation may be a fast throttle mode. In the slow throttle mode, the current level of the bus voltage may be maintained by the power plant. The flow of power may be from the power plant and into the propeller drive unit and the battery, or the battery may be on a float. As a result, the propeller of the propeller drive unit may be driven entirely, or almost entirely, by power being generated by the power plant and available to the propeller drive unit over the power bus. Meanwhile, the battery may be maintained in a desired state of charge (SOC) via either a trickle charge of current from the power plant and into the battery, or a trickle discharge of current out of the battery and into the propeller drive unit or other loads.

The slow throttle mode may be a "steady state" or normal mode of control. In the slow throttle mode, the propeller drive unit may respond to small changes in the speed requested. A speed request may be associated with a speed of a component of the propeller drive unit, such as a speed of a rotor of a motor or generator, a speed of an engine or a propeller, or a ground or air speed of the vehicle.

The system may identify throttle requests as being small by comparing a requested change in speed associated with a throttle request with a pre-determined threshold. If the throttle request or associated requested change in speed is less than the pre-determined threshold, the system may identify the throttle request as being small. As a result, the system may remain in the slow throttle mode and not transfer to a fast throttle mode of control.

In the slow throttle mode, the small throttle requests may indicate that a pilot or a driver does not need a rapid change in vehicle speed. The system may adjust the power plant to increase or decrease power being generated to be commensurate with a new speed of a propeller drive unit associated with the throttle request. As the power plant slowly adjusts to the new power level associated with the small change in speed requested, the available power on the bus changes. The propeller drive unit may increase or decrease the speed of the propeller or other component in accordance with the amount of power available on the power bus and being generated by the power plant. In other words, in the slow throttle mode of operation, the propeller drive unit, or a speed thereof, may "track" the power being generated by the power plant.

In the fast throttle mode, the processing unit may direct the propeller drive unit to rapidly increase a speed of the propeller drive unit, such as a motor or a propeller speed. As a result, the propeller drive unit may require more power than currently being provided by the power plant as the power plant may not respond quickly to throttle requests. Rather, it may take time for the power plant to come up to speed, i.e., change the amount of power being generated. The propeller drive unit may draw the additional power necessary to rapidly increase propeller, motor, or other speed from the battery via the bus. For example, in responding to a throttle request, the propeller drive unit may draw excess power from the bus, causing the level of bus voltage to fall to approximately battery voltage. Subsequently, the battery may maintain bus voltage at approximately battery voltage and supply the excess current needed for the propeller drive unit to quickly answer the throttle request and change the speed of the propeller drive unit to that requested.

The processing unit may direct the power plant to generate more or less power commensurate with the speed requested. As the power plant gradually generates more or less power, the bus voltage may return to a steady state in which the bus voltage is being determined by the power plant, and the flow of power is once again from the power plant and into the propeller drive unit and any auxiliary loads, as well as into or to float the battery.

The power management system may identify throttle change requests approximately equal to or above a pre-determined threshold as being major throttle change requests. Major throttle change requests may trigger the power management system to switch from the slow throttle mode into the fast throttle mode. A pre-determined threshold may be approximately a five, ten, or twenty percent change in propeller drive unit speed. Other thresholds may be used.

Additionally or alternatively, the electric power management system may switch from the slow throttle mode into the fast throttle mode based upon user selection of one or more throttle mode settings. The system may include various user selections and/or switches associated with a slow throttle mode, a fast throttle mode, a regeneration mode, and other control modes. A selection of a slow throttle mode switch may place the system in the slow throttle mode. Likewise, a selection of a fast throttle mode switch may place the system in the fast throttle mode.

Multiple modes of control may be provided. The propeller drive units may include a processor and be self-regulating. The flow of power may be bi-directional with respect to the propeller drive units. Power may flow into the propeller drive units in slow or fast throttle conditions. In addition to the slow throttle mode (powering the propeller drive unit from the power plant) and the fast throttle mode (powering the change in requested propeller drive unit speed from the battery), a regeneration mode may result in the propeller drive units providing power onto the bus and into the battery and other loads (such as during wind-milling).

Thus, in normal operations, the propeller drive units may draw power to create thrust. However, the system may also provide for dynamic braking and burning reactive power. Dynamic braking may include the using an electric motor of the propeller drive unit as a generator when slowing the vehicle. The power generated by the propeller drive unit may be dissipated as heat. Additionally, "regenerative" power generated by the propeller drive unit may be placed on the bus and lower energy consumption. Using dynamic braking to slow an aircraft may lower wear on landing gear components.

The system may maintain the battery at approximately a 70-80% state of charge. In a situation where it may be desirable to dump power, such as to rapidly decrease propeller drive unit speed, a less than fully charged battery may have excess power storage capacity. Simultaneously, a battery having a 70-80% SOC may be sufficiently charged to support a fast control mode of operation upon a substantial throttle request.

I. Exemplary Power Management System

FIG. 1 illustrates an exemplary electric power management system 100. The power management system 100 may include a fuel supply 102, a flow control 104, an alternator rectifier unit 106, a power bus 112, a battery 114, and one or more propeller drive units 116, 118. The electric power management system may include additional, fewer, or alternative components.

A fuel tank may store the fuel supply 102. The fuel 102 may power the alternator rectifier unit 106. The flow of fuel to the alternator rectifier unit 106 may be controlled by a flow control 104. The flow control 104 may include electrical and mechanical components. As an example, the flow control 104 may include various solenoid operated valves. Other types of electronically controlled valves may be used. In one embodiment, the fuel 102 may be liquid hydrogen. Other fuels may be used, including fossil fuels.

The alternator rectifier unit 106 may include an internal combustion motor 108 and a generator 110. The internal combustion motor 108 may run on the fuel 102. The internal combustion motor 108 may operate in conjunction with the generator 110 to generate power. The generator 110 may place the generated power onto the power bus 112. In an alternative embodiment, the system may include an external combustion motor, a battery, one or more fuel cells, a solar array, an environmental energy harvesting device, or other devices instead of an alternator rectifier unit and/or motor.

In a slow throttle mode, power primarily or exclusively from the generator 110 may power the propeller drive units 116, 118. The propeller drive units 116, 118 may be connected to the power bus 112.

The power bus 112 may be interconnected with a battery 114. The battery 114 may include a single cell or a series of battery packs. The battery 114 may be operable to draw current from, or place current onto, the power bus 112. In one embodiment, the battery may be a lithium ion battery. Each battery pack may comprise approximately 105 batteries. The battery may be manufactured from A123 Systems, Inc.™ of Watertown, Mass. Other batteries may be used.

As an example, if the generator 110 generates a voltage that is higher than the voltage of the battery 114, current may flow from the generator 110 into the propeller drive units 116, 118 and the battery 114, charging the battery 114. On the other hand, the propeller drive units 116, 118 may be drawing sufficient current and power from the power bus 112 such that the bus voltage falls. If the bus voltage falls below the battery voltage of the battery 114, current may flow from the battery 114 into the propeller drive units 116, 118, powering, at least in part, the propeller drive units 116, 118 from the battery 114.

II. Exemplary Power Bus

Figure 2:
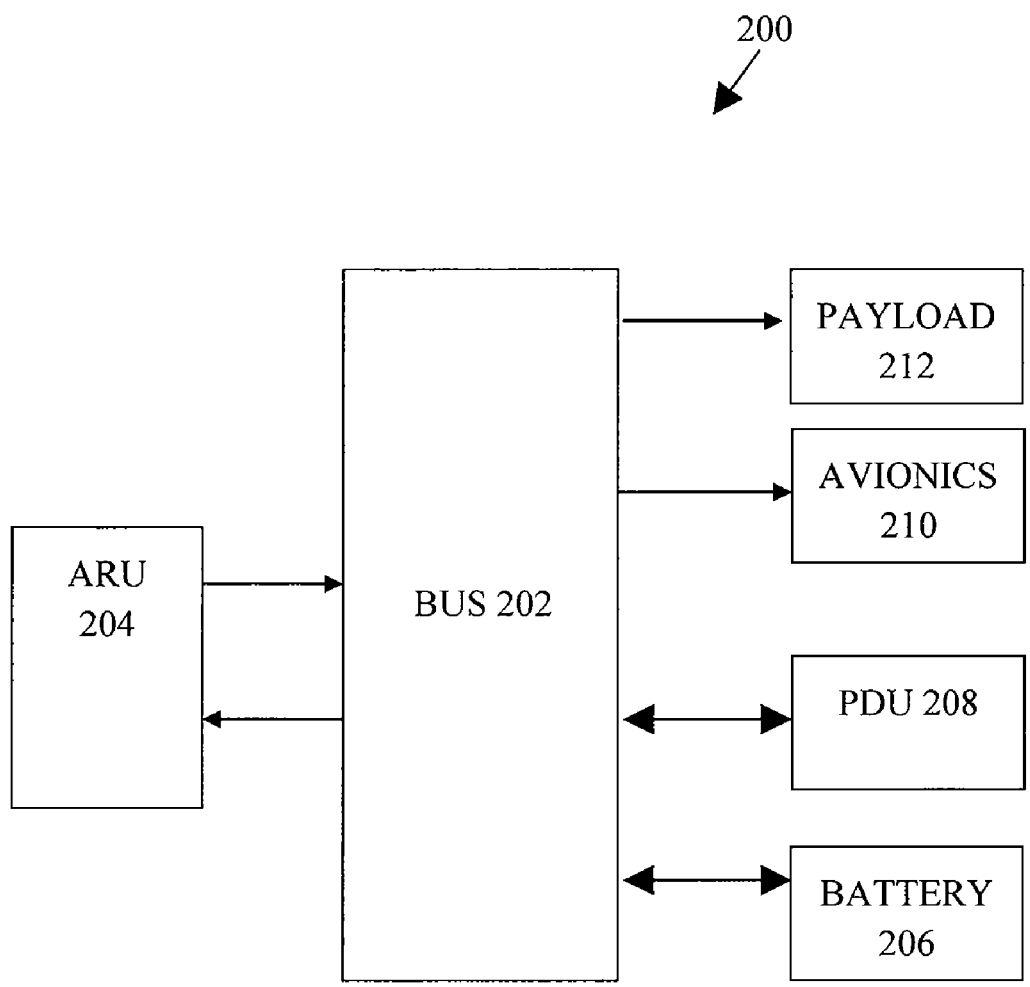
FIG. 2 illustrates an exemplary power bus.

FIG. 2 illustrates an exemplary power bus 200. The bus 200 may include busswork 202 and interconnect an alternator rectifier unit (ARU) 204, a battery 206, a propeller drive unit 208, avionics 210, and a payload 212. The power bus 200 may interconnect additional, fewer, or alternative components.

The alternator rectifier unit 204 may provide power onto the busswork 202. The avionics 210, such as actuators, and payload 212, such as sensors and imaging devices, may take power from the busswork 202. The propeller drive unit 208 and battery 206 may also take power from the busswork 202, as well as put power onto the busswork 202.

The power bus 200 may be controlled by a controller in two or more control modes. The power bus 200 may be controlled in a slow throttle mode and a fast throttle mode. In the slow throttle mode, power on the power bus 200 may be changed slowly and controlled by the output of the internal combustion motor. Little or no power may be added to the power bus from the battery to supplement the bus voltage in this mode. On the other hand, in the fast throttle mode, power may be taken from the battery to bring the propeller drive unit(s) up to a requested speed as quickly as possible. In one embodiment, the fast throttle mode may be used for takeoffs and landings of an aircraft, or responding to substantial increases or decreases in requested propeller drive unit speed, such as may be requested during high wind conditions.

III. Exemplary Control

Figure 3:
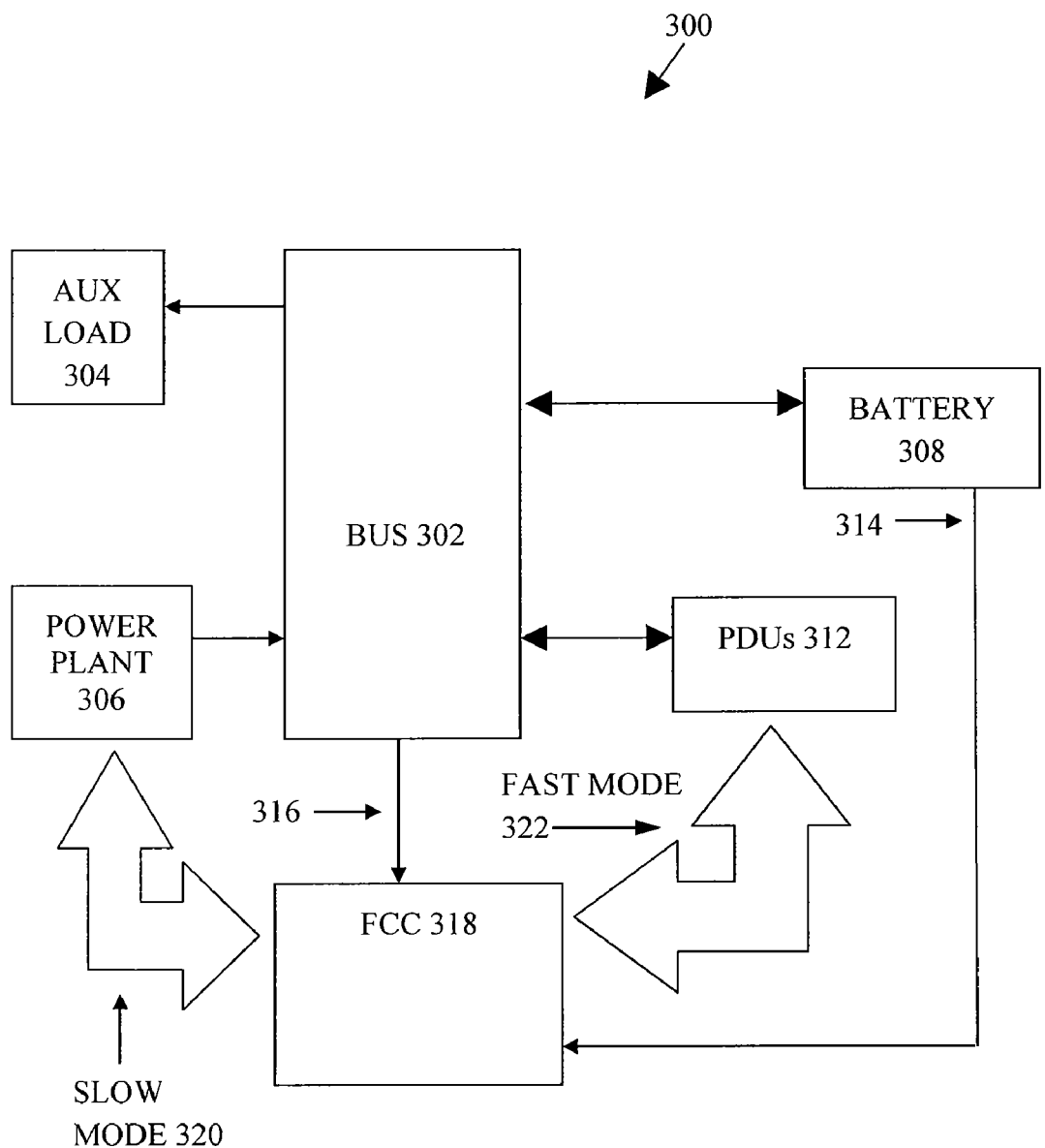
FIG. 3 illustrates exemplary control of a power management system.

FIG. 3 illustrates exemplary control of a power management system 300. The system may include a power bus 302, an auxiliary load 304, a power plant 306, a battery 308, propeller drive units 312, and a flight control computer (FCC) 318. The system may include additional, fewer, or alternative components.

During normal operation, the flight control computer 318 may control the power management system 300 in a slow throttle mode of control 320, as discussed herein. The slow throttle mode 320 may be based on powering the propeller drive units 312 primarily or entirely from the power plant 306.

However, during other times when rapid reaction of the propeller drive units 312 to throttle requests may be needed, the flight control computer 318 may control the power management system 300 in a fast throttle mode of control 322, as discussed herein. The fast throttle mode 322 may be based on powering the propeller drive units 312 from both the power plant 306 and the battery 308. Additional power in excess of the power currently being generated by the power plant 306 and necessary to adjust a speed of the propeller drive units 312 in accordance with a throttle request may be immediately taken from the battery 308 in the fast throttle mode 322. As a result, the lag time that may be required for the power plant 306 to gradually adjust power generation corresponding to a new speed that is being requested may be alleviated.

The flight control computer 318 may receive feedback 314, 316 from the power bus 302 and/or the battery 308. The feedback may be representative of the bus voltage or the current flowing out the battery 308 or the battery voltage.

IV. Exemplary Method

Figure 4:
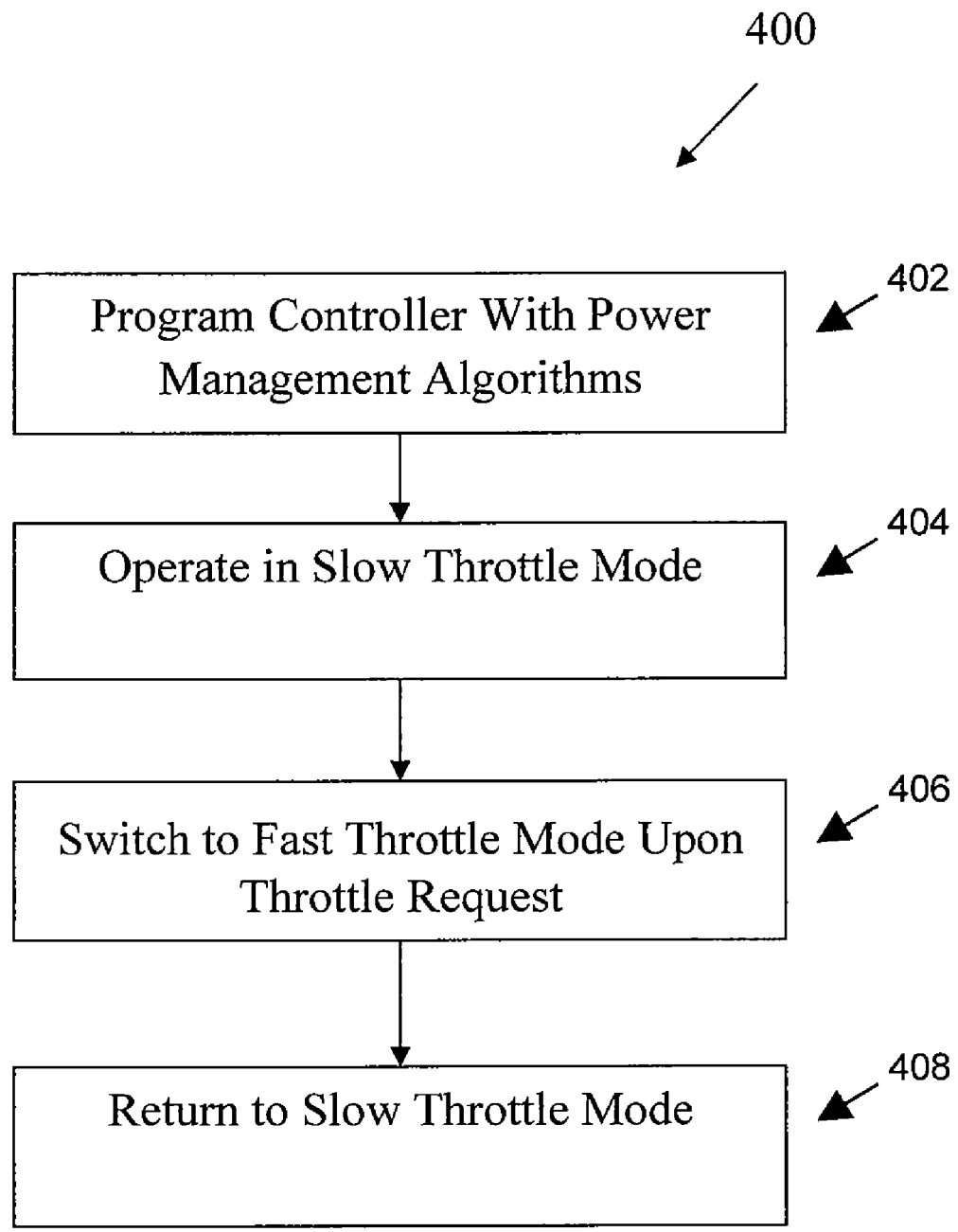
FIG. 4 illustrates an exemplary method for switching control modes of a power management system.

FIG. 4 illustrates an exemplary method of switching control of a power management system between multiple modes. The method 400 may include programming a controller with power management algorithms 402, operating in a normal or slow throttle control mode 404, operating in a fast throttle control mode upon receiving a significant throttle or other request 406, and returning to slow throttle control mode 408. The method may include additional, fewer, or alternative actions.

The control algorithms may generate a propeller drive unit control current that powers the operation of the propeller drive unit(s) as discussed herein. The method 400 may include controlling each individual propeller drive unit in a plurality of distinct modes of operation. Each distinct mode of operation may provide a different source of power that drives the propeller drive unit via the bus.

In the slow throttle mode 404, the method may maintain bus voltage such that generally only the power plant powers the propeller drive unit. In one embodiment, an amount of power available to the propeller drive unit via the bus may be added slowly as the internal combustion motor of the power plant comes up to a speed commensurate with a slight increase in the requested propeller speed, and little or no power may be added to the bus from the battery.

In the fast throttle mode 406, the propeller drive unit may draw more power than that being provided by the power plant. The method may switch from the slow throttle mode to the fast throttle mode. In one embodiment, after the system switches to the fast throttle mode, the requested increase in power necessary to bring the propeller drive unit up to a requested propeller speed as quickly as possible may be taken from the battery. As a result, in the slow throttle mode the bus voltage may be maintained by the power plant and in the fast throttle mode the bus voltage may be maintained, at least in part and temporarily, by the battery.

The method 400 may include directing the power plant to adjust power being generated to correspond to a new speed being requested after switching to the fast throttle mode. Once the power plant is generating power commensurate with powering the propeller drive unit(s) at the new speed requested, and accounting for the auxiliary loads being powered from the bus, the method may return system control to the slow throttle mode 408 such that power is no longer being taken from the battery.

V. Exemplary Architecture

A. Power Management System

Figure 5:
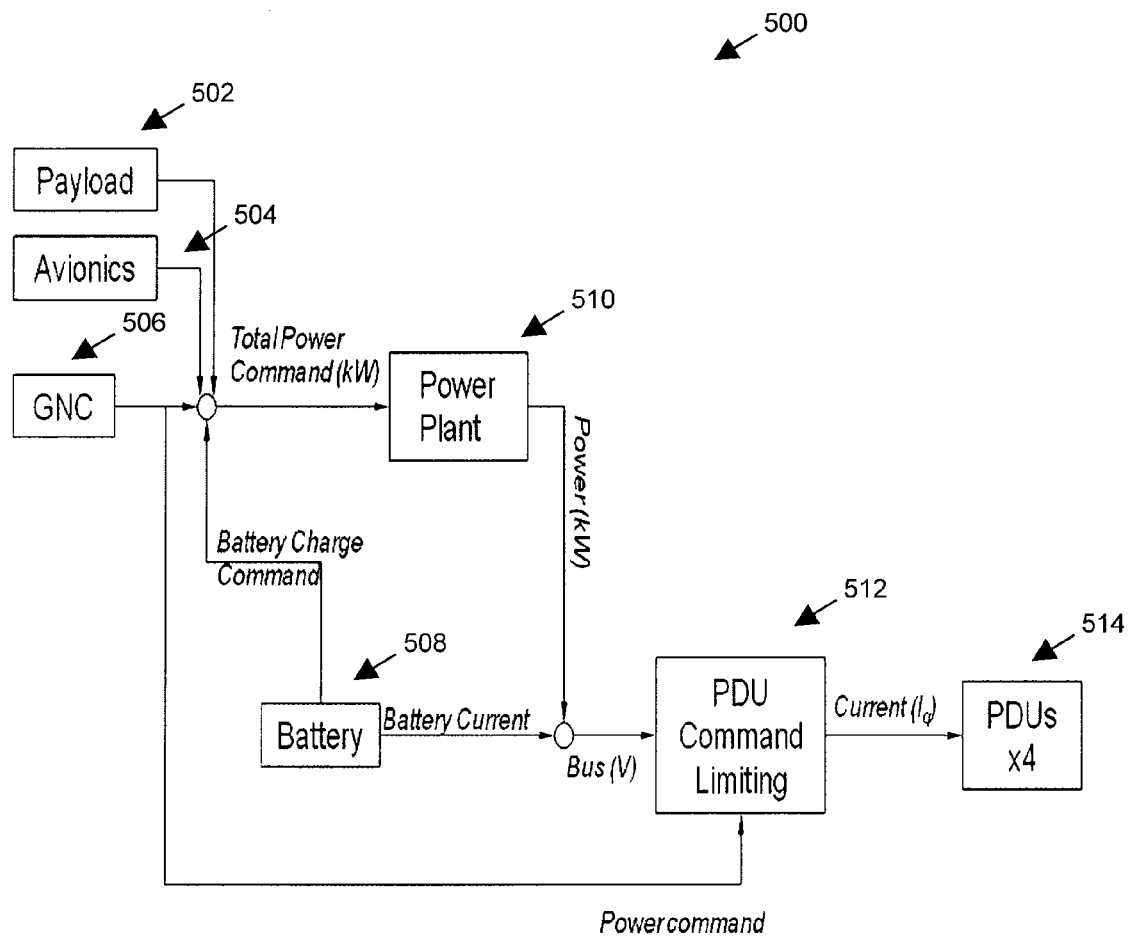
FIG. 5 illustrates an exemplary power management system architecture.

FIG. 5 illustrates an exemplary architecture for a power management system 500. The system 500 may include one or more payloads 502, avionics 504, a guidance navigation and control (GNC) unit 506, a battery 508, a power plant 510, propeller drive unit (PDU) command limiting software and/or hardware 512, and one or more propeller drive units 514. The architecture may include additional, fewer, or alternative components.

As shown in FIG. 5, the power plant 510 may respond to a total power command signal that is generated by combing signals received from the payloads 502, avionics 504, and the GNC unit 506, and a battery charge command signal associated with a battery 508 state of charge. The total power command signal may correspond to a total power being requested by the system loads. The total power command signal may be received by the power plant 510 or a processor associated with controlling the power plant 510.

The power plant 510 may generate and place power onto a power bus. The battery 508 may charge or discharge depending upon a current level of battery voltage with respect to the bus voltage. The battery 508 may feed current onto the bus when power demand from the propeller drive units 514 exceeds the power being generated by the power plant 510.

PDU command limiting logic and/or circuitry 512 may be used to generate a current that supplies the physical propeller drive units 514. The PDU command limiting unit 512 may accept bus voltage as one input and a power command, such as a power command from the GNC unit 506, as another input. The PDU command limiting unit 512 may condition the bus voltage to provide a desired current to the propeller drive units 514 based upon whether the current operational mode is a slow throttle mode, a fast throttle mode, or other mode.

The PDU command limiting logic and/or circuitry 512 may facilitate fast/slow throttle behavior that limits stress on or cycling of the battery. The stress limiting may be accomplished by the operation of the propeller drive units 514. For instance, a voltage set point may be determined by and associated with zero battery current. As shown in the Figures and discussed below, in a slow throttle mode: (1) bus voltage may be allowed to change in small variations about the set point, (2) upper and lower voltage limits may prevent significant battery use; and (3) a command curve may have one or more portions that include a constant gain or a constant limit. In a fast throttle mode: (1) bus voltage may be allowed to vary widely about the set point (such as vary more than in the slow throttle mode); (2) upper and lower voltage limits may set battery charge and discharge rates; and (3) outside limits and limiting commands may be used, such as employing maximum and minimum current and voltage limits.

B. Propeller Drive Unit

In one embodiment, the system may include a lightweight, high efficiency motor drive unit used to turn the propellers of an aircraft. There may be four to eight propeller drive units interconnected with the power management system. A propeller drive unit controller (PDC) may drive each propeller drive unit.

The propulsion system may include four main subcomponents: (1) an ironless permanent magnet motor and/or generator, (2) an inverter and controller, (3) a propeller, and (4)

Ethernet switches. The propulsion system may include additional, fewer, or alternative components.

Figure 6:
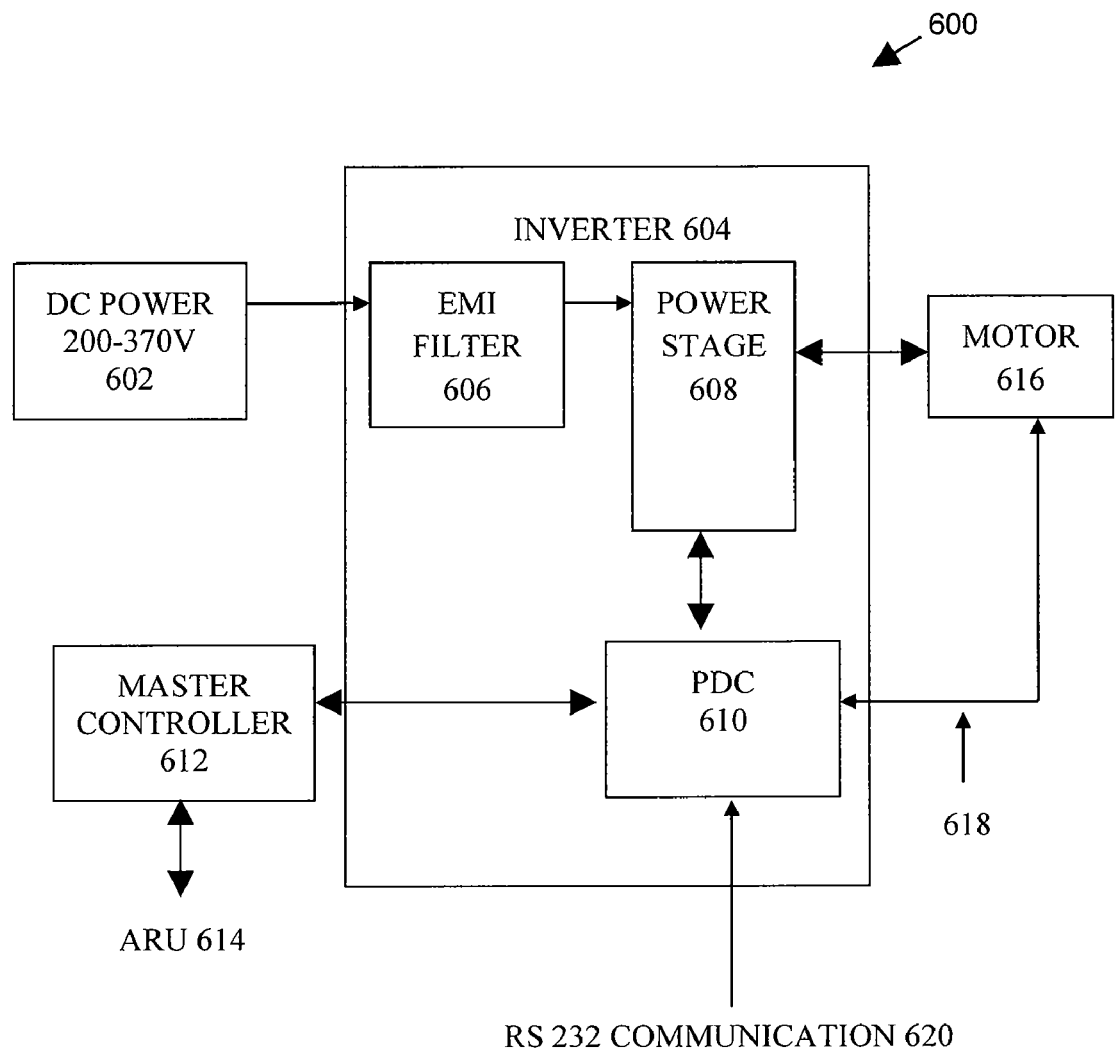
FIG. 6 illustrates an exemplary propeller drive unit schematic.

FIG. 6 is an exemplary schematic of a propeller drive unit 600. The propeller drive unit 600 may include an inverter 604, an electro-magnetic interference (EMI) filter 606, a power stage 608, a propeller drive unit controller 610, a motor 616, and a propeller (not shown). The propeller drive unit 600 may include additional, fewer, or alternative components.

The propeller drive unit 600 may accept a DC voltage on a power bus 602. In one embodiment, the DC voltage may be between approximately 200 V and approximately 370 V. Other voltages may be used.

The controller 610 may be in communication, such as RS 232 communication 620, with various controllers, networks, and devices. The controller 610 may also receive signals from, and transmit signals to, a master controller 612, such as over an Ethernet or using IEEE 802 standards. The master controller 612 may be in two-way communication with an alternating rectifier unit 614.

The EMI filter 606 may remove noise from the power signal received from the DC power bus 602. The power stage 608 may transform the power signal. The power stage 608 may provide power to both the controller 610 and a motor 616 associated with the propeller drive unit 600. The motor 616 may be interconnected with a propeller (not shown) that facilitates vehicle movement. The propeller may include a conventional variable transmission operable at various gear ratios.

The motor 616 may receive commands from the controller 610 and provide feedback and sensor signals 618 back to the controller 610. The motor 616 may include a number of sensors, such as temperature and speed sensors. The motor 616 may send temperature, speed, and other signals 618 to the controller 610. The controller 610 may alter operation of the propeller drive unit 600 in response to the signals received.

C. PDU Command Limiting Curve

Figure 7:
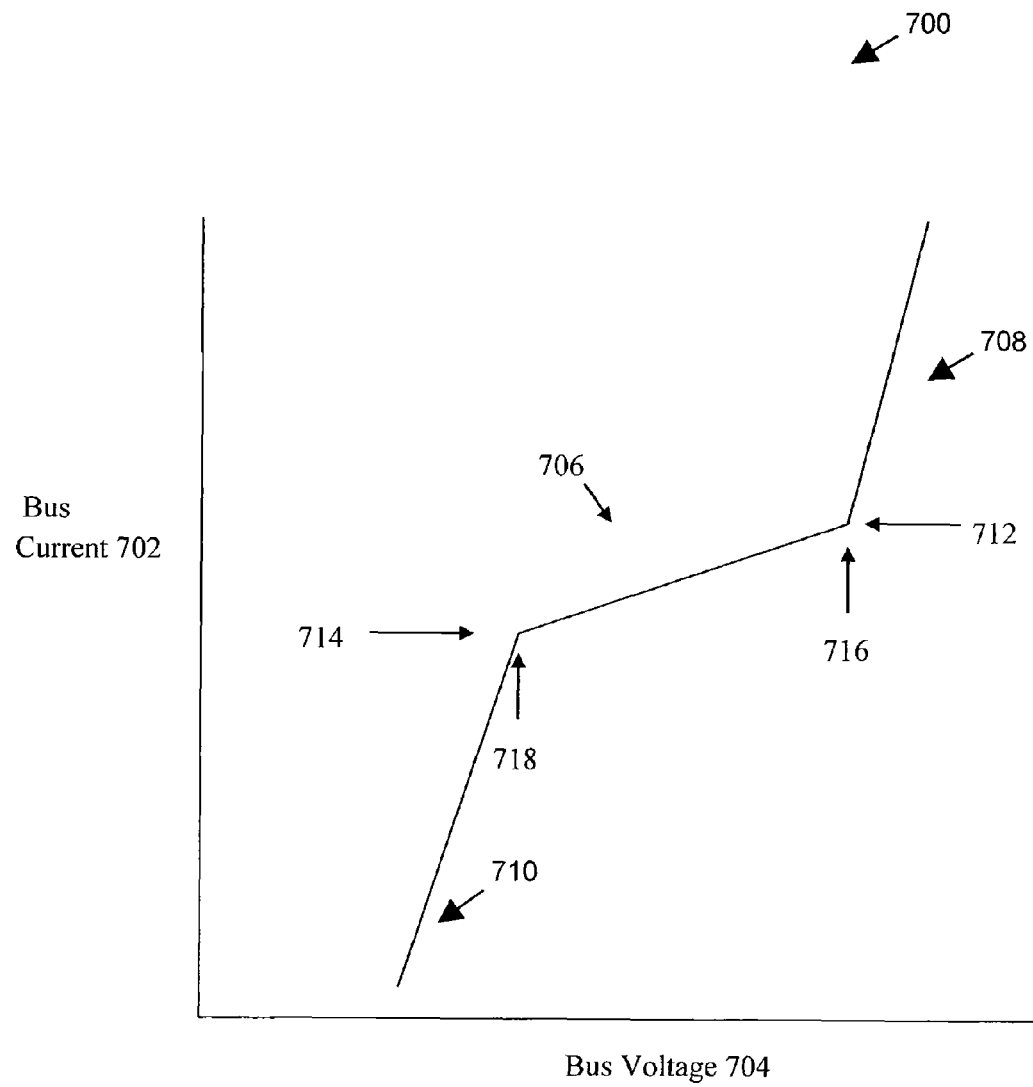
FIG. 7 illustrates an exemplary PDU command curve.

FIG. 7 illustrates an exemplary PDU command limiting curve 700. The PDU command limiting curve 700 depicts a conditioned current generated by the electrical power management system that controls the operation of the propeller drive unit.

The power management system may be configured to maintain bus current and voltage in accordance with the graph of FIG. 7. The y-axis of FIG. 7 indicates a bus current 702 being provided to a propeller drive unit, and the x-axis indicates the bus voltage 704. As the bus voltage 704 changes, the system may adjust a bus current 702 being generated by PDU command limiting circuitry and/or software and powering the propeller drive unit(s).

The PDU command limiting functionality may provide a control graph of current versus voltage that includes a minimum voltage portion 710, a control range 706, and a maximum voltage portion 708. The minimum voltage portion 710 may have a slope of bus current versus bus voltage associated with a low voltage gain. The maximum voltage portion 708 may have a slope of bus current versus bus voltage associated with a high voltage gain. The PDU command limiting curve 700 may include upper and lower voltage limits, and upper and lower current limits to enhance system reliability and stable control of the overall system and individual propeller drive units. For instance, excessive bus current and voltage may damage busswork and auxiliary loads, or overspeed motors leading to loss of propeller drive unit control.

The PDU command limiting functionality may be configured to maintain the bus current 702 within the control range as much as possible. The control range may be defined by a lower bus voltage 718 and an upper bus voltage 716, and a lower bus current 714 and an upper bus current 712. When the bus voltage 704 is at the lower limit 718, a command current of a level of the lower bus current 714 may be generated, and when the bus voltage 704 is at the higher bus voltage limit 716, a command current of a level of the higher bus current 712 may be generated. Other control ranges may be used.

D. Controls and Regulation Handler

The power management system may regulate bus voltage. The basic bus voltage regulation may be implemented as shown below in Table I. To ensure proper paralleling and load sharing between propeller drive units, preferably proportional gain may be used. The bus voltage regulation depicted by Table I may ensure (1) balanced propeller loading, and (2) tight voltage loop voltage regulation. The propeller loading may be distributed evenly among a plurality of propeller drive units. The voltage regulation may use actual bus voltage as feedback to condition a reference voltage signal.

As shown in Table I, a reference bus voltage and a bus voltage may be sent to a summer, the result of which may be fed to a proportional gain unit to generate a reference current signal. The reference current signal may be sent to a current regulator to be further conditioned. Other bus voltage regulation may be used.

TABLE I

Exemplary Bus Voltage Regulation

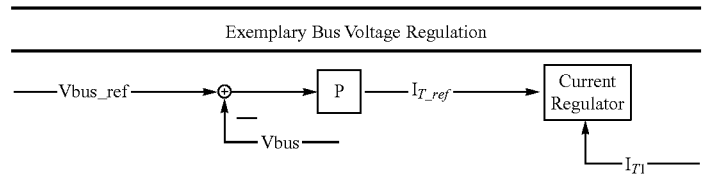

The power management system may regulate bus current. The basic bus current regulation may be implemented as shown in Table II below. The bus current regulation may ensure proper paralleling and load sharing between propeller drive units. Preferably, a proportional integral gain may be used.

As shown in Table II, a reference bus current and a bus current may be sent to a summer, the output of which may be sent to a proportional integrator. The proportional integrator may generate a reference current that is sent to a current regulator, which may generate a command current to control a propeller drive unit. Other bus current regulation may be used.

TABLE II

Exemplary Bus Current Regulation

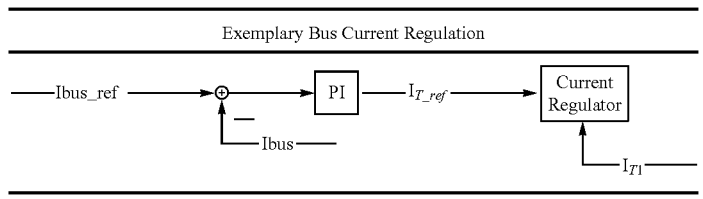

E. Current Regulator

Figure 8:
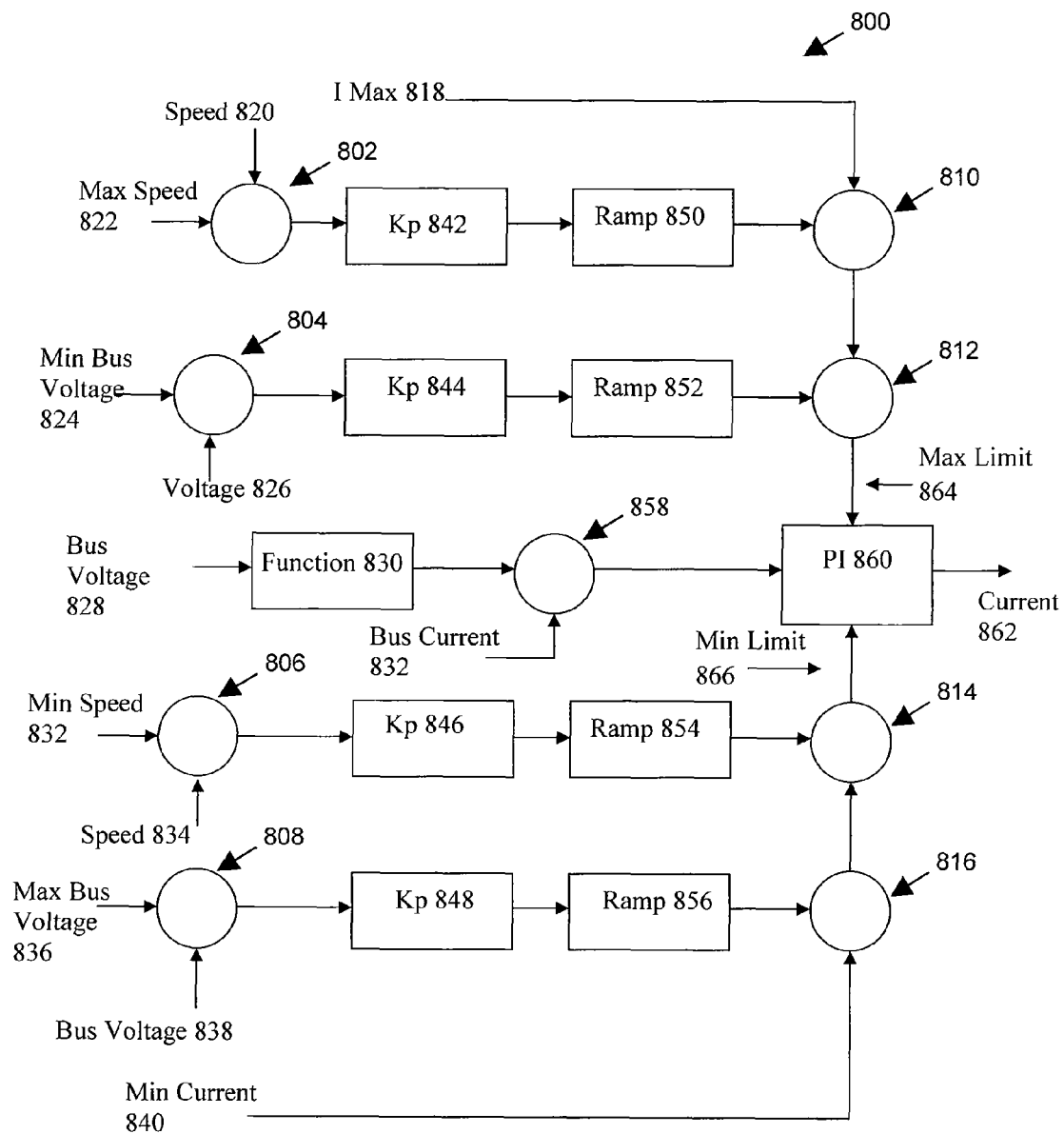
FIG. 8 illustrates an exemplary current regulator.

FIG. 8 illustrates an exemplary command current regulator 800. The current regulator 800 may generate a command current controlling the propeller drive unit in accordance with a control graph, such as the one depicted in FIG. 7.

Upper and lower bus voltage thresholds may be used to condition a bus voltage signal. The upper and lower bus voltage thresholds may be used to ensure that the bus voltage is within an upper and lower range.

A conditioned bus voltage 828 is shown in FIG. 8. The conditioned bus voltage 828 may be adjusted by a function based on current settings 830, and be limited by maximum and minimum current limits. Subsequently, the conditioned bus voltage 828 may be sent to a summer 858, the output of which may be sent to a proportional integrator (PI) 860.

The top half of FIG. 8 may provide a maximum current limit signal 864 and the lower half of FIG. 8 may provide a minimum current limit signal 866 to the proportional integrator 860. The proportional integrator 860 may then produce a PDU command current signal 862. In one embodiment, the PDU command current signal 862 may be the bus current shown in the present Figures, including FIG. 7. Other propeller drive unit command currents may be used.

As shown in FIG. 8, a maximum current signal 818 may be supplied to a first summer 810. A maximum speed signal 822 and an actual speed signal 820 (representing a current speed of a propeller drive unit component) may be sent to a summer 802 to produce a signal that may be adjusted by a constant 842 and a ramp function 850 before being received by the first summer 810.

The output of the first summer 810 may be adjusted at a second summer 812. A minimum bus voltage signal 824 and a bus voltage signal 826 may be sent to a summer 804 to produce a signal that may be adjusted by a constant 844 and a ramp function 852 before being received by the second summer 812. The second summer 812 may send a maximum current limit signal 864 to the proportional integrator 860.

As shown on the bottom of FIG. 8, a minimum current signal 840 may be supplied to a third summer 816. A maximum bus voltage signal 836 and a bus voltage signal 838 may be sent to a summer 808 to produce a signal that may be adjusted by a constant 848 and a ramp function 856 before being received by the third summer 816.

The output of the third summer 816 may be adjusted at a fourth summer 814. A minimum speed signal 832 and an actual speed signal 834 (representing a current speed of a propeller drive unit component) may be sent to a summer 806 to produce a signal that may be adjusted by a constant 846 and a ramp function 854 before being received by the fourth summer 814.

The fourth summer 814 may send a minimum current limit signal 866 to the proportional integrator 860, which may generate the command current 862 as noted above. In one embodiment, the command current 862 may be a torque command sent to the propeller drive unit.

The logic of FIG. 8 may be employed in a programming language, such as Turbo C, Turbo C++, C, Pascal, object orientated language or other programming languages. Preferably, a C based language is used. The software may generate a current that controls one or more of the propeller drive units.

The software may include a main or void function that regulates DC bus current. The main routine may call routines that (1) retrieve a bus current command request, (2) limit bus current within a maximum and minimum current, (3) calculate an adjustment to bus current (using a lower and an upper voltage threshold, and a lower and an upper voltage gain), (4) filter the bus current, and (5) limit bus current to within a range defined by a maximum and a minimum current limit.

The software may include a first routine that adjusts the upper current limit of the bus current regulator based on exceeding a speed limit or when the bus voltage goes below a minimum acceptable bus voltage. The first routine may accept bus voltage, speed, maximum current, maximum speed, and minimum bus voltage as inputs, and return a maximum current limit.

The software may include a second routine that adjusts the upper current limit of the bus current regulator based on the rotor turning below the lower speed limit or when the bus voltage exceeds the maximum acceptable bus voltage. The second routine may accept bus voltage, speed, minimum current, minimum speed, and maximum bus voltage as inputs, and return a minimum current limit.

The software may include a third routine that calculates a bus current adjustment based on bus voltage. The third routine may accept bus voltage, a lower and an upper voltage threshold, a change in current between the lower and upper voltage thresholds, a lower voltage gain (associated with bus current when bus voltage is less than a lower voltage threshold), and a higher voltage gain (associated with bus current when bus voltage is greater than an upper voltage threshold) as inputs, and return a bus current adjustment.

The software may also include a routine to float the voltage, speed, and/or current about set points or within band limits. Software routines with additional, less, or alternative functionality may be used.

F. Voltage Band Definitions

Figure 9:
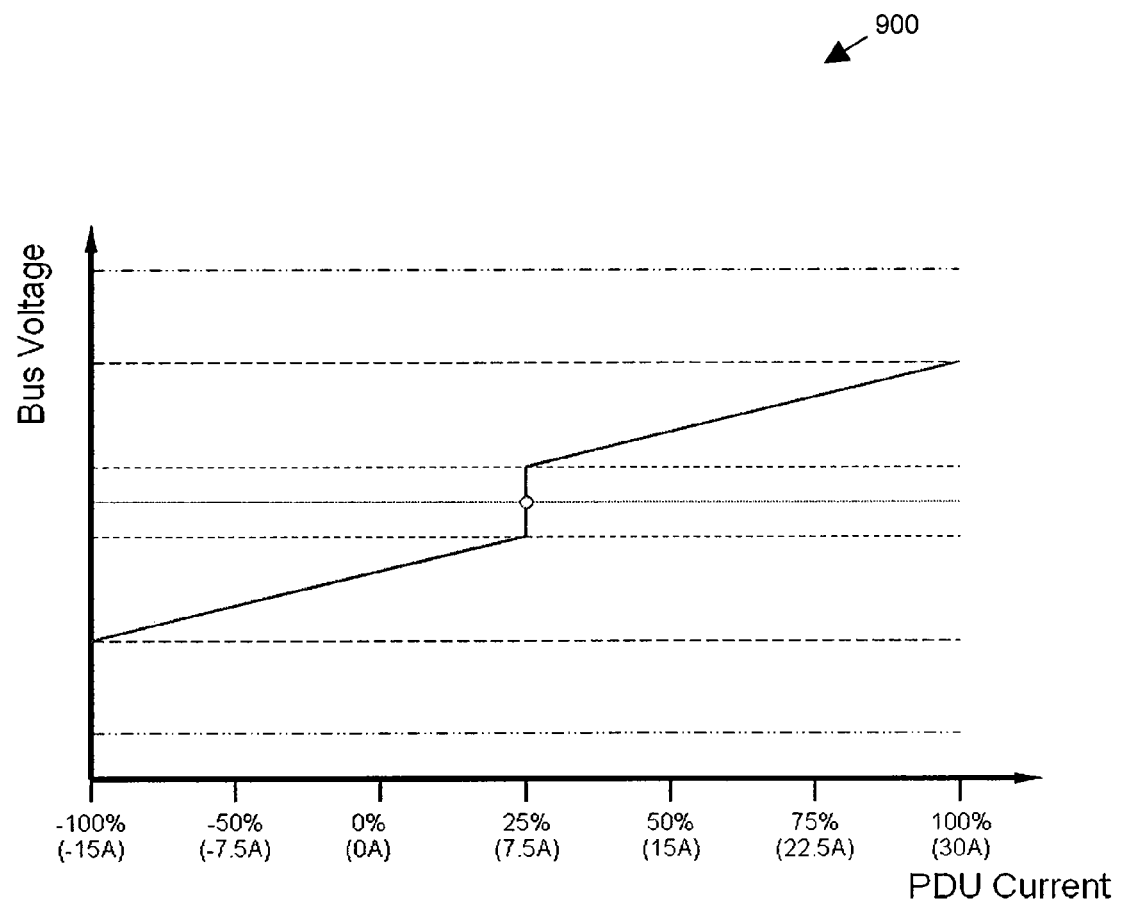
FIGS. 9 and 10 illustrate exemplary voltage bands associated with PDU control.

FIGS. 9-14 indicate command curves that may be generated by the voltage and current regulation discussed herein. FIG. 9 illustrates an exemplary PDU command limiting curve 900 with bus voltage being indicated on the y-axis and PDU current being indicated on the x-axis. A PDU command current may be unmodified within a voltage band, such as at a command current of 7.5 Amps as shown in FIG. 9. Tightly controlling the PDU command current within a voltage band may enhance system control and reliability. The PDU command range may be increased for higher bus voltages. Likewise, the PDU command range may be decreased for lower bus voltages.

Figure 10:
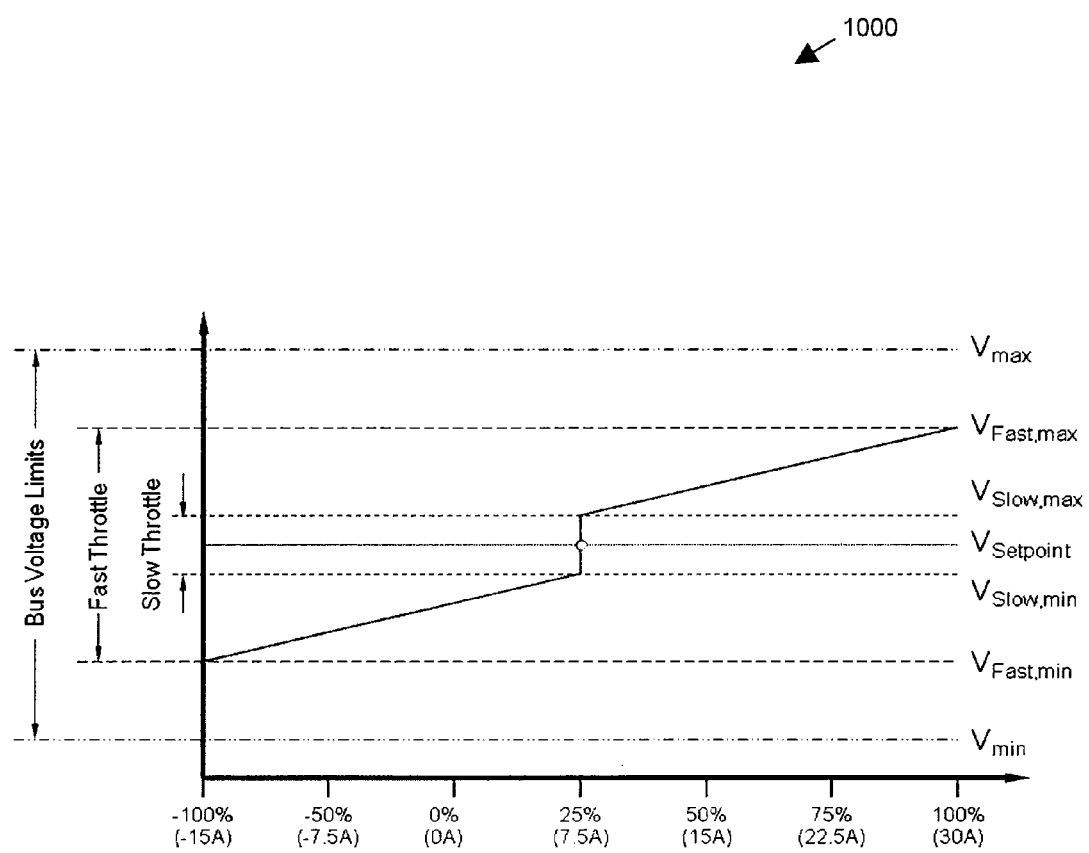

FIG. 10 illustrates exemplary voltage band definitions 1000. The y-axis may indicate (1) a slow throttle voltage range, (2) a fast throttle voltage range, and (3) bus voltage limits. As shown, the control curve may be centered about a set point located at 7.5 Amps. The slow throttle voltage range may be within and smaller than the larger fast throttle voltage range. The slow throttle voltage range may be defined by a maximum slow mode voltage and a minimum slow mode voltage. The fast throttle voltage range may be defined by a maximum fast mode voltage and a minimum fast mode voltage. The bus voltage may be defined by maximum and minimum voltage limits.

The PDU command current may be invariant to bus voltage change within a band. For instance, FIG. 10 illustrates that the PDU command current may be fixed at approximately 7.5 Amps within the maximum and minimum voltage limits of the slow throttle voltage band. Additionally, the PDU command current may be restricted when bus voltage exceeds band limits.

G. Slow/Fast Throttle Modes

Figure 11:
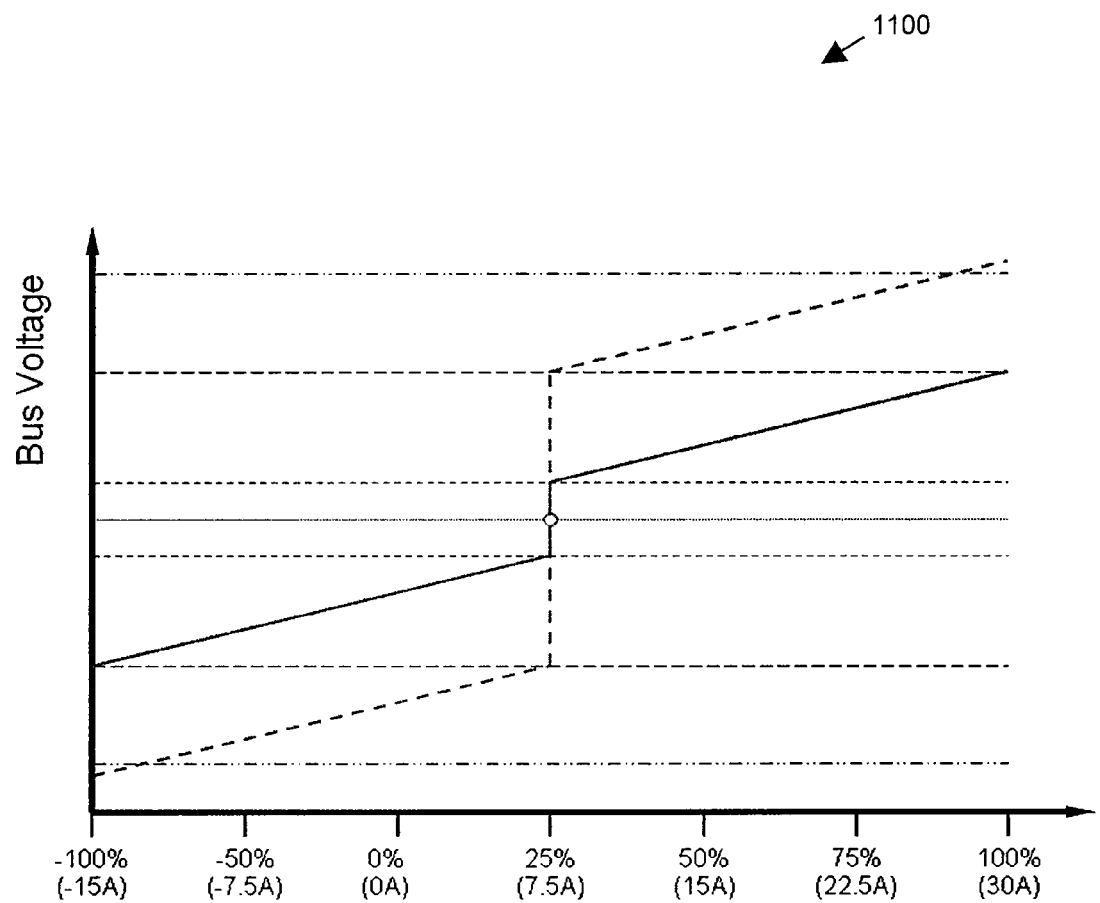
FIG. 11 illustrates exemplary slow and fast throttle modes.

FIG. 11 illustrates exemplary control curves associated with slow and fast throttle modes 1100. Again, the y-axis depicts bus voltage and the x-axis depicts propeller drive unit current. The solid line may depict a slow throttle control curve and the dashed line may represent a fast throttle control curve.

As shown, the slow throttle control may be more tightly controlled than the fast throttle control. The fast throttle control may operate over a larger bus voltage range, such as to accommodate sudden and significant requested changes in propeller drive unit speed. Controlling the propeller drive unit to rapidly change speed and draw the excess power required to increase speed in the fast throttle mode may cause larger bus transients than in the slow throttle mode, in which the propeller drive unit may be directed to slowly track the power being generated by the power plant.

H. Transient Behavior

Figure 12:
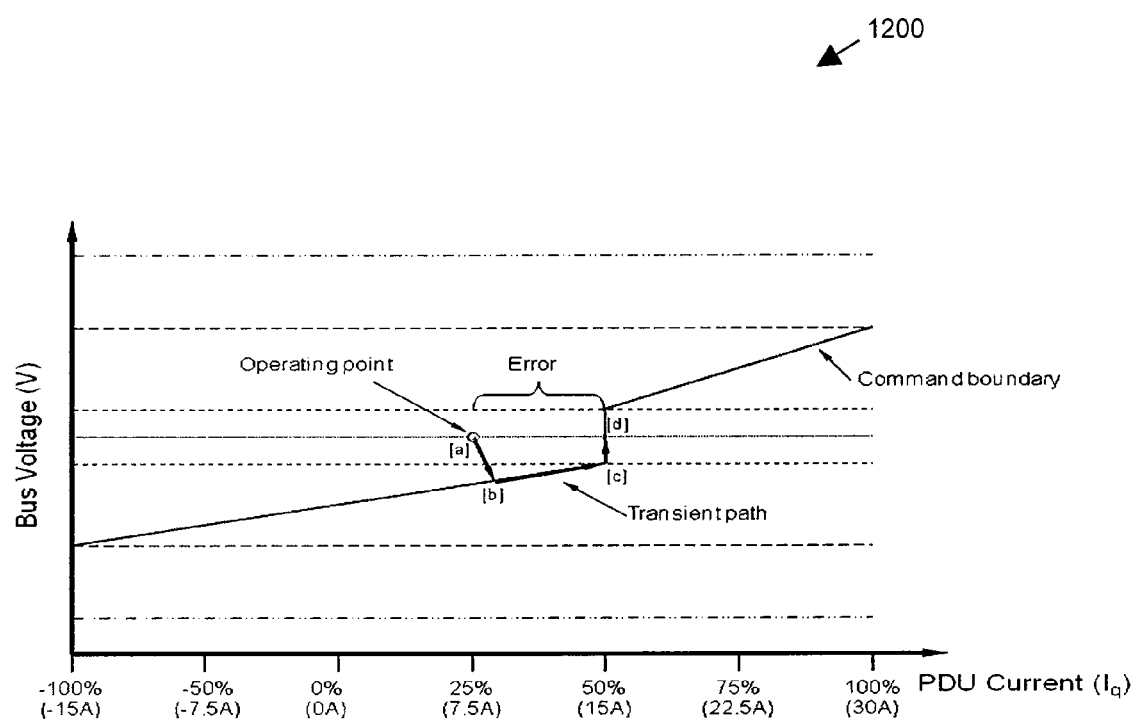
FIG. 12 illustrates exemplary transient behavior.
Figure 13:
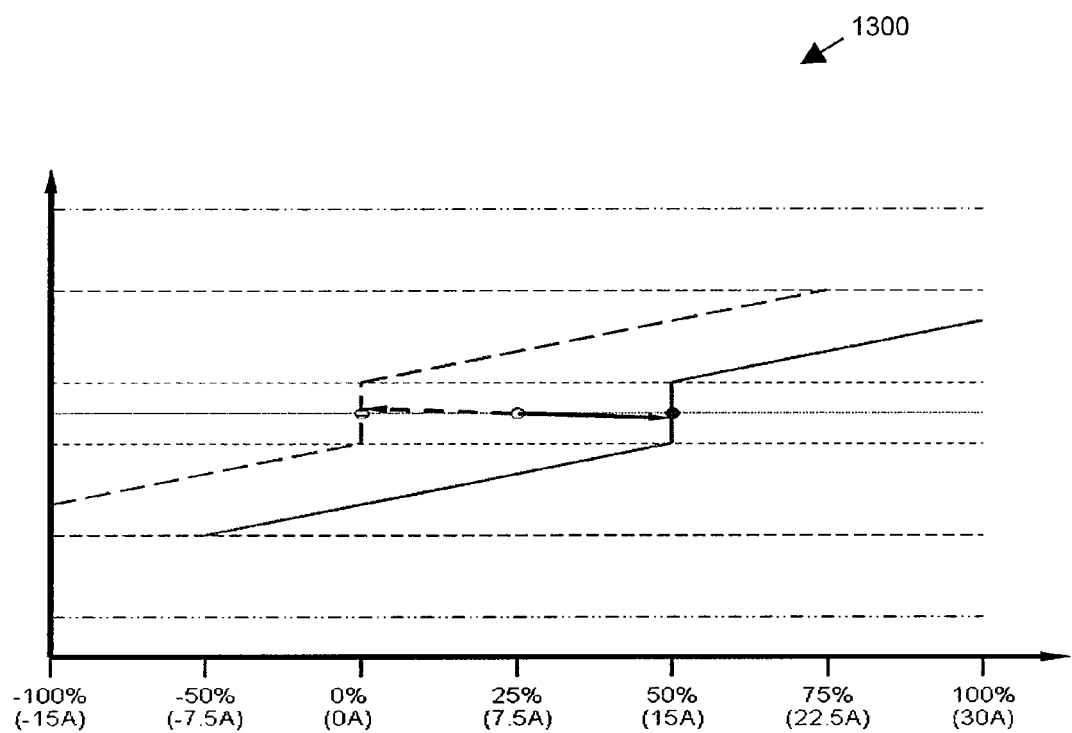
FIG. 13 illustrates exemplary differential throttle control.
Figure 14:
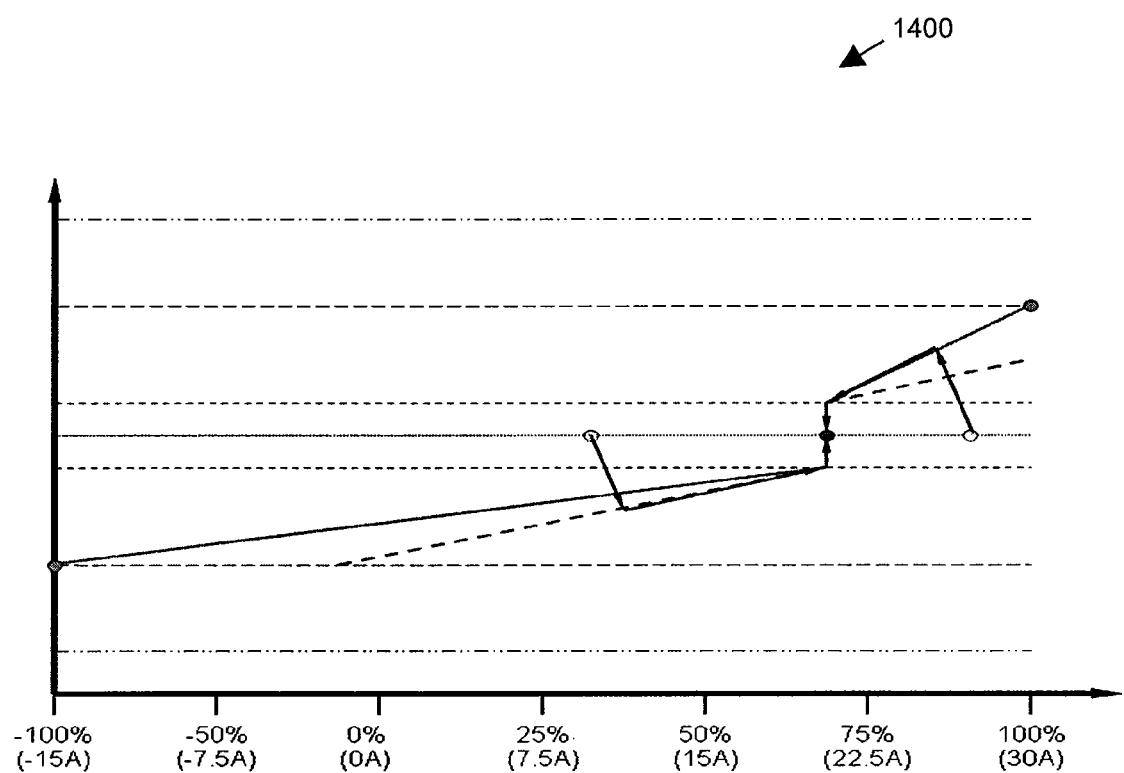
FIG. 14 illustrates an exemplary command limiting gain.

FIGS. 12 through 14 illustrate exemplary transient behavior of a power management system 1200, 1300, 1400. Again, the y-axis depicts the bus voltage and the x-axis depicts the propeller drive unit current. Transient behavior on the bus may be the result of transferring from slow control mode to fast control mode, or other increase/decrease in loads.

As shown in FIG. 12, point A may be an initial operating point. The initial operating point A may at an initial propeller drive unit current being at 25% of maximum allowable command current. A throttle request may be received that commands the system to increase speed of the propeller drive unit. In the example shown, the change in speed requested corresponds to increasing propeller drive unit current to 50% of maximum allowable current.

At point B, bus voltage may drop due to the increase in propeller drive unit load. The bus voltage may fall to or below battery voltage, causing the battery to discharge current onto the bus and into the propeller drive unit. In one embodiment, command current going into the propeller drive unit may be reduced to approximately 30% to avoid further voltage drop.

At point C, the power plant may slowly respond to command signals. The power plant may increase power production and bus voltage. As a result, propeller drive unit command current may increase. At point D, bus voltage may return to nominal. The propeller drive unit, power plant, and battery may achieve and return to steady state. In sum, moving from point B to C may be a transient path; from point A to point C may be associated with system error; and from point D onward to the right of FIG. 12, bus voltage may be limited by an upper limit command gain boundary.

FIG. 13 illustrates an exemplary differential throttle command curve 1300. Propeller drive units on a right wing may be controlled differently than propeller drive units on a left wing. For instance, propeller drive units may be controlled at different speeds or in different directions.

In FIG. 13, the solid line may depict an advancing propeller drive unit command limit. The dashed line may depict a retarding propeller drive unit command limit. The solid arrow may depict advancing propeller drive unit command trajectory. The dashed arrow may depict retarding propeller drive unit command trajectory.

FIG. 14 illustrates an exemplary command limit gain. The solid line may depict a variable gain, with a fixed limit. The dashed line may depict a fixed gain, with a variable limit. The arrows may depict transient command trajectory. FIG. 14 illustrates two initial operating points for the system. From either of the initial operating points, the system may achieve the limit specified (center, solid dot).

In sum, the fast/slow voltage bands may be centered about a propeller drive unit voltage set point. The voltage set point may be (1) an approximate voltage at which batteries provide desired current, (2) a high voltage for battery charging, or (3) a low voltage for discharging the battery. The voltage set point may vary with battery state of charge (SOC), the battery model, and battery current feedback to the propeller drive unit. The power management system may vary the bus voltage, but keep the current constant (with the variable voltage). A lower and higher bus voltage limit may be used.

VI. Exemplary Applications

In one application, the vehicle may be a remote controlled, unmanned drone capable of sustained flight up to about 65,000 feet above ground. The drone may operate above air traffic and weather, have over a week-long flight duration, provide station-keeping capabilities, operate in conjunction with backup platforms to ensure continuous and remote intelligence gathering coverage over areas of interest, and may be interconnected directly into an external communications network.

The drone may serve as a platform to relay communications and other payloads. The drone may facilitate two-way broadband, voice, and/or narrow band communications, and may capture and facilitate the broadcast of video and/or audio. The drone may communicate with (1) fixed user equipment having antennas as small as approximately two inches, (2) gateway stations, (3) the internet, (4) satellite dishes, and (5) mobile user equipment, such as hand-held devices, cell phones, PDAs, laptops, GPS devices, and other devices.

The unmanned drone may be in communication with a mission control station located on the ground via a satellite link. The drone may provide real-time high-resolution video imaging that may be accessible in real-time to combat units—on the ground, in the air, and at sea.

Mission examples for the drone may include persistent stare communications or GPS functionality, detection and location of electromagnetic interference, tactical on-station weather and communication monitoring, dynamic tasking by theatre commanders, communications augmentation, bandwidth expansion, robust coverage to areas with little to no other coverage, gathering persistent and actionable intelligence in real-time, jamming, jammer tracking, missile defense, battle ground and air space awareness, airspace collision avoidance, and dedicated communications support.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. An electric power management system for a vehicle, the electric power management system comprising:
   a power plant configured to generate electrical power and to supply a voltage to a power bus;
   a battery interconnected with the power bus, the battery configured to be charged from current generated by the power plant and supplied from the power plant to the battery via the power bus;
   a propeller drive unit interconnected with the power bus, and drawing power from the power plant via the power bus to cause movement of the vehicle; and
   a controller configured to direct the power management system in a plurality of distinct modes of operation, each distinct mode of operation controlling the propeller drive unit in a different manner, wherein the controller is configured to maintain bus voltage within a range defined by a maximum and minimum voltage while bus current remains approximately at a set point,
   wherein a first distinct mode of operation is a slow throttle mode and a second distinct mode of operation is a fast throttle mode;
   in the slow throttle mode, the flow of power is substantially only from the power plant and into the propeller drive unit and the battery; and
   in the fast throttle mode, the flow of power is from the battery and the power plant and into the propeller drive unit, and an increase in propeller drive unit speed that is requested is initially powered generally entirely by the battery, such that in the fast throttle mode, the propeller drive unit speed is not limited by a present level of power being generated by the power plant.

2. The power management system of claim 1, wherein in the slow throttle mode, a level of the bus voltage is maintained by the power plant and the bus voltage is high enough such that the flow of power is from the power plant and into the propeller drive unit and into the battery, such that a propeller rotated by a motor of the propeller drive unit is driven by power generated primarily by the power plant while the battery is maintained in a state of trickle charge.

3. The power management system of claim 2, wherein in the fast throttle mode, the controller directs (1) the propeller drive unit to rapidly increase a propeller speed such that the propeller drive unit draws more power than currently being provided by the power plant to the propeller drive unit via the bus, resulting in the propeller drive unit drawing the additional power necessary to rapidly increase propeller speed from the battery, and (2) the power plant to generate more power commensurate with the propeller speed requested such that as the power plant gradually generates more power, the bus voltage returns to a state in which the bus voltage is being determined by the power plant and the flow of power is once again from the power plant and into the propeller drive unit and the battery.

4. The power management system of claim 1, wherein the propeller drive unit comprises a propeller and uses the power drawn from the power plant and the battery via the bus to rotate the propeller, and the propeller drive unit is configured to supply power to the battery via the bus by wind-milling the propeller in a regeneration mode of operation.

5. The power management system of claim 1, wherein the power plant includes an internal combustion motor configured to use liquid hydrogen as a fuel.

6. The power management system of claim 1, wherein the vehicle is a remote controlled, unmanned aircraft, and an avionics unit and a guidance navigation and control unit are interconnected to the power bus.

7. An electric power management system for a vehicle, the electric power management system comprising:
   a power plant configured to generate electric power and to supply a voltage to a power bus;
   a battery interconnected with the power plant via the power bus, the battery being configured to either discharge current to the power bus or draw current from the power bus to charge itself depending upon a level of a bus voltage associated with the power bus;
   a propeller drive unit interconnected with both the power plant and the battery via the power bus, the propeller drive unit configured to draw power from the power plant and battery via the power bus; and
   a controller configured to direct the electric power management system in a plurality of distinct modes of operation, each distinct mode of operation powering the propeller drive unit in a different manner, wherein the controller is configured to maintain bus voltage within a range defined by a maximum and minimum voltage while bus current remains approximately at a set point,
   wherein a first distinct mode of operation is a slow control mode and a second distinct mode of operation is a fast control mode;
   in the slow control mode, the controller directs that changes in the speed of the propeller drive unit track changes in the power being generated by the power plant by directing the propeller drive unit to use only approximately an amount of power being provided to the propeller drive unit from the power plant via the power bus;
   in the fast control mode, the controller directs that the propeller drive unit quickly respond to an increase in speed requested of the propeller drive unit by drawing the additional power necessary from the battery to attain the requested speed and in excess of the power being provided to the propeller drive unit by the power plant from the battery via the power bus such that the speed of the propeller drive unit is not limited by a level of power being generated by the power plant.

8. The power management system of claim 7, wherein in the slow control mode, the bus voltage is maintained such that the power plant supplies power to the propeller drive unit, and an amount of power available to the propeller drive unit via the bus is added slowly as an internal combustion motor of the power plant comes up to speed commensurate with a small change in requested propeller speed and no power is added to the bus from the battery.

9. The power management system of claim 8, wherein in the fast control mode of operation, the propeller drive unit draws more power than being provided by the power plant and the requested increase in power necessary to bring the propeller drive unit up to a large change in requested propeller speed as quickly as possible is taken from the battery, the large change in requested propeller speed associated with the fast control mode is larger than the small change in requested propeller speed associated with the slow control mode such that in the slow control mode the bus voltage is maintained by the power plant and in the fast control mode the bus voltage is maintained by the battery.

10. The power management system of claim 7, wherein the propeller drive unit uses the power drawn from the bus to rotate a propeller, and the speed of the propeller drive unit corresponds to propeller speed.

11. The power management system of claim 10, wherein the power plant includes an internal combustion motor that uses liquid hydrogen as a fuel, and the propeller drive unit is configured to supply power to the battery via the bus by wind-milling the propeller in a regeneration mode.

12. The power management system of claim 7, wherein the controller switches from slow control mode to fast control mode based upon user selection of a fast control mode setting or upon identifying a change in requested propeller drive unit speed that is greater than or approximately equal to a predetermined threshold.

13. A method of electric power management, the method comprising:
    generating electric power from a power plant located on a vehicle, the power plant being interconnected with a bus;
    powering a propeller drive unit of a vehicle in a slow throttle mode of operation from a voltage placed onto the bus by the power plant, the propeller drive unit configured to drive a propeller using power from the power plant in the slow throttle mode; and
    switching to a fast throttle mode of operation in which the propeller drive unit immediately draws additional power necessary from the battery to increase propeller speed by an amount requested and in excess of the power being provided to the propeller drive unit by the power plant via the bus,
    wherein in the fast throttle mode, (1) bus voltage varies about a set point; and (2) upper and lower voltage limits set battery charge and discharge rates.

14. The method of power management of claim 13, the method comprising:
    receiving a throttle request requesting a change in propeller speed of the propeller driven by the propeller drive unit;
    identifying if the change in propeller speed requested is above a predetermined threshold;
    switching to the fast throttle mode of operation if it is determined that the change in propeller speed requested is approximately equal to or greater than the predetermined threshold; and
    after switching to the fast throttle mode of operation, directing the power plant to adjust power being generated to be commensurate with the propeller speed being requested and any other loads being powered by the power plant via the bus.

15. The method of power management of claim 13, the method comprising switching to the fast throttle mode of operation by user selection of a fast throttle mode setting.

16. The method of power management of claim 13, the method comprising wind-milling the propeller of the propeller drive unit in a regeneration control mode such that power is generated from the propeller drive unit and placed onto the bus, thereby charging the battery.

17. The method of power management of claim 13, wherein the power plant generates power from liquid hydrogen and the vehicle is an unmanned aircraft and operated via remote control.

18. A method of electric power management, the method comprising:
    generating electric power from a power plant located on a vehicle, the power plant being interconnected with a bus;
    powering a propeller drive unit of a vehicle in a slow throttle mode of operation from a voltage placed onto the bus by the power plant, the propeller drive unit configured to drive a propeller using power from the power plant in the slow throttle mode; and
    switching to a fast throttle mode of operation in which the propeller drive unit immediately draws additional power necessary from the battery to increase propeller speed by an amount requested and in excess of the power being provided to the propeller drive unit by the power plant via the bus,
    wherein in the slow throttle mode, (1) bus voltage is allowed to change in smaller increments about a set point than in the fast throttle mode, and (2) a control limiting curve includes a portion having a constant voltage gain.

19. The method of power management of claim 18, the method comprising:
    receiving a throttle request requesting a change in propeller speed of the propeller driven by the propeller drive unit;
    identifying if the change in propeller speed requested is above a predetermined threshold;
    switching to the fast throttle mode of operation if it is determined that the change in propeller speed requested is approximately equal to or greater than the predetermined threshold; and
    after switching to the fast throttle mode of operation, directing the power plant to adjust power being generated to be commensurate with the propeller speed being requested and any other loads being powered by the power plant via the bus.

20. The method of power management of claim 18, the method comprising switching to the fast throttle mode of operation by user selection of a fast throttle mode setting.

21. The method of power management of claim 18, the method comprising wind-milling the propeller of the propeller drive unit in a regeneration control mode such that power is generated from the propeller drive unit and placed onto the bus, thereby charging the battery.

22. The method of power management of claim 18, wherein the power plant generates power from liquid hydrogen and the vehicle is an unmanned aircraft and operated via remote control.

* * * * *

UNITED STATES PATENT AND TRADEMARK OFFICE
CERTIFICATE OF CORRECTION

PATENT NO. : 8,296,036 B2
APPLICATION NO. : 12/565426
DATED : October 23, 2012
INVENTOR(S) : Thaddeus Benjamin Matuszeski et al.

Page 1 of 1

It is certified that error appears in the above-identified patent and that said Letters Patent is hereby corrected as shown below:

In the Claims

In column 17, claim 13, line 23, after "necessary from" replace "the" with --a--.

In column 18, claim 18, line 16, after "necessary from" replace "the" with --a--.

Signed and Sealed this
Second Day of July, 2013

Teresa Stanek Rea
*Acting Director of the United States Patent and Trademark Office*